No. 841,294. PATENTED JAN. 15, 1907.
W. W. WHITCOMB.
COMPOSITE SHEET OR LAYER.
APPLICATION FILED OCT. 10, 1906.

Witnesses.
Inventor
William W. Whitcomb
by Jas. H. Churchill
Atty.

UNITED STATES PATENT OFFICE.

WILLIAM W. WHITCOMB, OF BROOKLINE, MASSACHUSETTS.

COMPOSITE SHEET OR LAYER.

No. 841,294.      Specification of Letters Patent.      Patented Jan. 15, 1907.

Application filed October 10, 1906. Serial No. 338,232.

*To all whom it may concern:*

Be it known that I, WILLIAM W. WHITCOMB, a citizen of the United States, residing in Brookline, in the county of Norfolk and State of Massachusetts, have invented an Improvement in Composite Sheets or Layers, of which the following description, in connection with the accompanying drawings, is a specification, like letters on the drawings representing like parts.

This invention has for its object to provide a flexible composite sheet, layer, or strip designed and adapted for a large variety of uses in which friction is required—such, for instance, as belts, coverings, or facings of pulleys, clutches, &c.

The present invention has for its object to provide a flexible body which is fibrous in whole or in part, with inserts of non-metallic material, preferably cork in its natural state, which form friction-surfaces with which increased gripping or holding effect may be obtained.

The flexible body referred to is made in the form of a sheet, layer, or strip of leather, rubber, and cloth or other suitable flexible material which is fibrous in whole or in part, and is provided with a plurality of sockets into which are fitted inserts, preferably of cork. The flexible sheet, layer, or strip may be cut into any desired shape to adapt it to the particular use desired, and the desired friction is obtained by means of the cork or other non-metallic inserts.

The particular features of this invention will be pointed out in the claims at the end of this specification.

Figure 1:
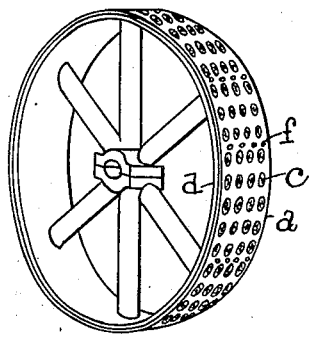
Figure 2:
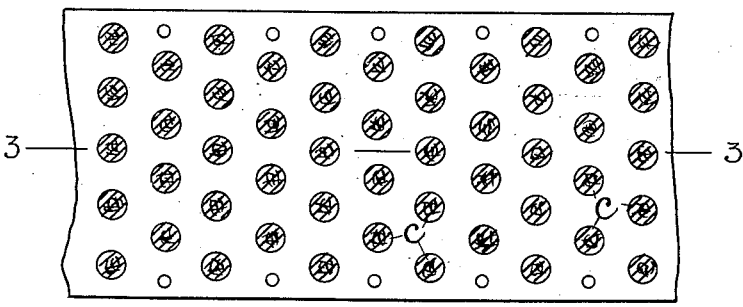
Figure 3:

Figure 1 represents a pulley provided with a facing embodying this invention; Fig. 2, a plan view of a portion of a composite sheet or strip of which the covering or facing shown in Fig. 1 is made; and Fig. 3, a section of the composite sheet or strip shown in Fig. 2, taken on the line 3 3.

The body portion of the flexible composite sheet or strip may be made of layers $a$ of fibrous material—such as cloth, canvas, and the like—cemented together by layers $b$ of rubber, or said body portion may be made of leather or other flexible fibrous material or materials.

The flexible body portion referred to is provided with a plurality of sockets or openings into which are fitted inserts $c$ of cork or other non-metallic material by means of which the desired friction may be obtained, so as to enable the flexible body portion to be employed to advantage in a large number of ways—such, for instance, as belts, facings, or coverings for pulleys $d$ or clutches, either cone, disk, or of other shape or construction. The cork inserts $c$ may be forced into their sockets or openings and retained therein by the expansion of the corks, or they may be made tapering to fit correspondingly-shaped sockets or openings, which latter may extend through the flexible body portion and be larger at the back or rear side of the same, in which case the inserts may be retained in their sockets by a flexible backing $e$, of cloth, leather, or other fibrous material.

When the composite flexible sheet or layer is used as a facing or covering for pulleys, clutches, and the like, it may be firmly secured in place by rivets or other fastenings $f$, inserted through suitable holes in the body portion of the composite sheet, layer, or strip, or it may be otherwise fastened.

The flexible composite sheet or strip may be made of sufficient length and breadth to be used as a belt, in which case increased frictional contact of the belt with a plain wooden or metal pulley may be obtained, owing to the non-metallic inserts.

The flexible composite sheet or strip may also be used as a facing or covering for pulleys after the manner represented in Fig. 1 and used with a plain belt of ordinary construction, with the advantage of obtaining increased gripping effect between the pulley and its belt. The same is true when the flexible composite sheet is used as a facing or covering for cone or disk clutches.

It will be seen that the flexible body portion may be made of any desired length and width and may also be cut to readily fit any desired shape of article and have imparted to it increased gripping effect by means of the non-metallic inserts.

It will thus be seen that the flexible composite sheet, strip, or piece thus made may be kept as a stock article ready to be applied to pulleys, clutches, and the like already in use when it is desired to increase the gripping effect of the same.

Furthermore, said composite sheets or strips may be made of any desired length and width and kept in stock.

I claim—

1. As an improved article of manufacture, a flexible composite sheet or strip composed of a flexible fibrous body portion in whole or in part provided with sockets or openings, and a plurality of inserts of non-metallic material extended into said sockets or openings, substantially as described.

2. As an improved article of manufacture, a flexible composite sheet or strip composed of a flexible body portion consisting of a plurality of fibrous layers cemented together and having holes or openings, and inserts of cork extended into said openings, substantially as described.

3. As an improved article of manufacture, a flexible composite sheet or strip composed of a body portion of fibrous material in whole or in part and having openings extended through it, inserts of non-metallic material extended into said openings, and a backing of flexible material secured to said body portion and covering said inserts, substantially as described.

4. As an improved article of manufacture, a flexible composite sheet or strip composed of a flexible body portion consisting of a plurality of fibrous layers connected together and having holes or openings, and inserts of cork extended into said openings, substantially as described.

In testimony whereof I have signed my name to this specification in the presence of two subscribing witnesses.

WILLIAM W. WHITCOMB.

Witnesses:
JAS. H. CHURCHILL,
J. MURPHY.